US008058995B2

(12) United States Patent
Barnett et al.

(10) Patent No.: US 8,058,995 B2
(45) Date of Patent: Nov. 15, 2011

(54) MULTI-FREQUENCY RFID IMAGE FORMING TECHNIQUES

(75) Inventors: Albert Tyler Barnett, Georgetown, KY (US); Raymond Michael Marowski, Lexington, KY (US); Forrest Lane Steeley, Lexington, KY (US); Mark Stephen Underwood, Lexington, KY (US); Evan James Powers, Philadelphia, PA (US)

(73) Assignee: Lexmark International, Inc., Lexington, KY (US)

( * ) Notice: Subject to any disclaimer, the term of this patent is extended or adjusted under 35 U.S.C. 154(b) by 379 days.

(21) Appl. No.: 12/211,391

(22) Filed: Sep. 16, 2008

(65) Prior Publication Data

US 2010/0066511 A1 Mar. 18, 2010

(51) Int. Cl.
*G08B 13/14* (2006.01)

(52) U.S. Cl. ................. 340/572.1; 340/572.7; 340/10.51
(58) Field of Classification Search .... 340/572.1–572.8, 340/551, 10.51; 29/287; 156/177
See application file for complete search history.

(56) References Cited

U.S. PATENT DOCUMENTS

| 6,104,291 | A  | * | 8/2000  | Beauvillier et al. | ........ | 340/572.1 |
| 6,246,326 | B1 | * | 6/2001  | Wiklof et al.      | .......... | 340/572.1 |
| 2001/0048361 | A1 | * | 12/2001 | Mays et al.        | .......... | 340/10.51 |
| 2008/0238673 | A1 | * | 10/2008 | Gopalan et al.     | .......... | 340/572.1 |

* cited by examiner

*Primary Examiner* — Anh V La (57) ABSTRACT

Techniques that enable printing of multi-frequency RFID label schemes are provided. This may include a device for enabling printing of multi-frequency RFID label schemes, a method for printing multi-frequency RFID label schemes, as well as an article having one or more storage mediums having instructions that when executed by one or more processors result in a process for printing a multi-frequency RFID label scheme.

22 Claims, 7 Drawing Sheets

MULTI-FREQUENCY RFID IMAGE FORMING TECHNIQUES

CROSS REFERENCES TO RELATED APPLICATIONS

None.

STATEMENT REGARDING FEDERALLY SPONSORED RESEARCH OR DEVELOPMENT

None

REFERENCE TO SEQUENTIAL LISTING

None.

BACKGROUND

1. Field of the Invention

The present disclosure relates generally to Radio Frequency Identification (RFID) technology and, in particular, to techniques that enable printing of multi-frequency RFID label schemes.

2. Description of the Related Art

Inkjet and laser printers are common in most workplace and home computing environments. Today, many printers may include multi-functional assemblies capable of printing on a large array of print media including letterhead, paper envelopes and labels. A recent innovation in the printing industry involves the manufacturing of print media with embedded radio frequency signatures in the form of Radio Frequency Identification (RFID) transponders or tags. These tags, sometimes called "Smart Labels", may be used with a variety of existing printing methods.

Embedded print media may include a backing material (sometimes referred to as the "web") upon which a label is applied, with a RFID tag sandwiched in between the label and the backing material. There may be one or more labels on the web and the sheet, as presented, may be part label and part plain paper. In some cases there may be more than one tag arrayed across the width and down the length of the media such that multiple columns and/or rows of tags are contained on the print media.

Printing on media with embedded RFID tags is rapidly becoming a growing area of label printing. Each tag on a sheet may be printed with certain data, and the RFID tag embedded within that media may be used to allow individualized processing of user associated data. For example, a shipping label might have the delivery address and a package tracking ID printed on it, while the corresponding tag would be programmed with the same information. The delivery information may then be read from the tag, whether or not the package is positioned so that the tag is visible.

There are several common operating frequencies used in RFID programming, these frequencies may include 13.56 MHz (HF) and 915 MHz (UHF). Each frequency range has a unique set of advantages and disadvantages which makes it uniquely suited to particular applications. For example, 13.56 MHz tags may have a shorter range (~1 m), lower power, and may be less expensive. Alternatively, 915 MHz tags have a longer range (~10 m) and a faster data transfer rate.

SUMMARY OF THE INVENTION

One embodiment of the present invention provides a device for printing a multi-frequency RFID label scheme. The device includes a first circuit configured to program a first RFID tag having a first frequency, a second circuit configured to program a second RFID tag having a second frequency; and a third circuit for communicating with and controlling each of the first and second circuits, and for incorporating each of the first and second RFID tags into a multi-frequency RFID label scheme that is printable by a single printing device. In one such embodiment, the first RFID is an HF RFID tag and the second RFID tag is a UHF RFID tag. The device may include a first antenna operatively coupled to the first circuit first antenna, the first antenna configured to permit communication between the first circuit and the first RFID tag over the first frequency. The device may further include a second antenna operatively coupled to the second circuit, the second antenna configured to permit communication between the second circuit and the second RFID tag over the second frequency. In one such embodiment, the first and second antennas are combined into a single substrate to form a single antenna assembly. In another such embodiment, the first antenna is configured to operate at approximately 13 to 14 MHz and the second antenna is configured to operate at approximately 865 to 928 MHz. The device may include a storage module configured to store a first tag object encoded with RFID tag information corresponding to the first RFID tag, and a second tag object encoded with RFID tag information corresponding to the second RFID tag, wherein the third circuit has access to the first and second tag objects. The RFID information may include, for example, one or more of a tag identifier, a tag operating frequency, a tag protocol, an operation to be performed, a tag position and data to be programmed. In one particular embodiment, the device is a physically removable module configured to be operatively coupled with a printing device. In another particular embodiment, the device is a printing device. In another particular embodiment, the first circuit, second circuit, and third circuit are integrated into a single module. In another particular embodiment, the device includes a first RF stage for operatively coupling the control module to the first antenna, and a second RF stage for operatively coupling the control module to the first antenna.

Another embodiment of the present invention provides a method for printing a multi-frequency RFID label scheme. The method includes receiving a print job that includes a multi-frequency RFID label scheme, and accessing RFID tag information associated with the multi-frequency RFID label scheme. The method continues with identifying a first RFID tag type associated with the multi-frequency RFID label scheme, including a first RFID operating frequency. The method further includes selecting an RFID programmer associated with the first RFID operating frequency, and programming a first RFID tag associated with the first RFID operating frequency. The method further includes identifying a second RFID tag type associated with the multi-frequency RFID label scheme, including a second RFID operating frequency. The method further includes selecting an RFID programmer associated with the second RFID operating frequency, and programming a second RFID tag associated with the second RFID operating frequency. The method may include determining if programming the first and second RFID tags was successful. In one particular embodiment, identifying first and second RFID tag types includes accessing at least one tag object data structure. In another particular embodiment, the method includes identifying a third RFID tag type associated with the multi-frequency RFID label scheme, including a third RFID operating frequency. In one such case, the method further includes selecting an RFID programmer associated with the third RFID operating frequency, and programming a third RFID tag associated with the third RFID operating frequency. The method may include one or more of returning a programming result to page management circuitry, and/or printing the multi-frequency RFID label scheme using a single printing device. The scheme may be printed, for example, on a single media.

Another embodiment of the present invention provides an article, which includes one or more storage mediums having stored thereon instructions that when executed by one or more processors result in execution of a process for printing a multi-frequency RFID label scheme. The process includes, for example, functionality such as the method previously described.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Conventional RFID label printing technology is limited to printing tags of only one particular frequency on a given printer. That is, in order to print and program both frequencies of tags for a given application, the user must have at least two printers. In addition, it is presently impossible to combine tags of both types on a single form, which means such an application requires procuring, stocking, and in some cases synchronizing the printing of two separate forms in order to use both frequency tags. Generally, the present disclosure relates to a device, system, method and article for programming radio frequency identification (RFID) tags having different frequencies using a singular image forming device. An image forming device may be understood as any device capable of providing images. Such devices may include fax machines, copiers, printers, scanners, multi-function devices or all-in-one devices and may utilize electrophotographic, inkjet, solid ink, thermal transfer and other printing systems. Other devices may also be used, as will be appreciated in light of this disclosure.

Figure 1:
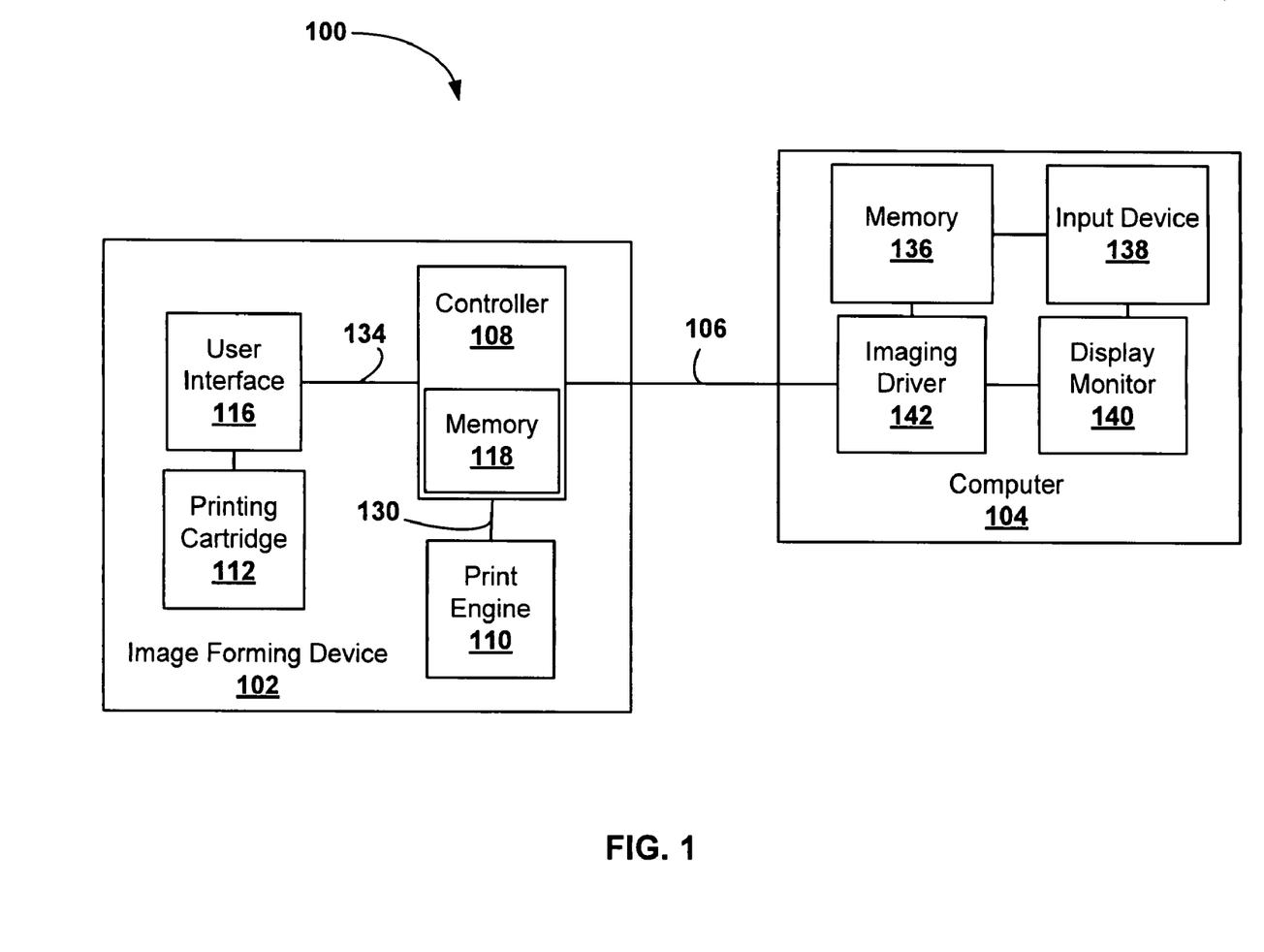
FIG. 1 is a block diagram of a system in accordance with an embodiment of the present invention.

Illustrated in FIG. 1, is an example of a system 100 having an image forming device 102 and a computer 104. The image forming device 102 may include a controller 108, a print engine 110, a printing cartridge 112, and a user interface 116. The image forming device 102 may communicate with computer 104 via communications link 106 using a standard communication protocol, such as for example, universal serial bus (USB), Ethernet or IEEE 802.xx. Controller 108 may include a processor unit and associated memory 118, and may be implemented as one or more Application Specific Integrated Circuits (ASICs) or Field Programmable Gate Arrays (FPGAs) or a microcontroller unit with input/output (I/O) capability and one or more embedded routines for carrying out functionality described herein. Memory 118 may be, for example, random access memory (RAM), read only memory (ROM), and/or non-volatile RAM (NVRAM). Alternatively, memory 118 may be in the form of a separate electronic memory (e.g., RAM, ROM, and/or NVRAM), a hard drive, a CD or DVD drive, or any memory device convenient for use with controller 108. Controller 108 may be, for example, a combined printer and scanner controller, although numerous controllers can be used here.

Controller 108 may communicate with print engine 110 via a communications link 130. User interface 116 may be communicatively coupled to controller 108 via a communications link 134. Controller 108 may serve to process print data and to operate print engine 110 during printing. Computer 104, which may be optional, may be, for example, a personal computer, including memory 136, such as RAM, ROM, and/or NVRAM, an input device 138, such as a keyboard/mouse combination, and a display monitor 140. Computer 104 may further includes a processor, input/output (I/O) interfaces, and may include at least one mass data storage device, such as a hard drive, a CD-ROM and/or a DVD unit.

Computer 104 may include in its memory a software program including program instructions that function as an imaging driver 142, e.g., printer/scanner driver software, for image forming device 102. Imaging driver 142 may be in communication with controller 108 of image forming device 102 via communications link 106. Imaging driver 142 may facilitate communication between imaging apparatus 102 and computer 104. One aspect of imaging driver 142 may be, for example, to provide formatted print data to image forming device 102, and more particularly, to print engine 110, to print an image.

In some circumstances, it may be desirable to operate image forming device 102 in a standalone mode. In the standalone mode, image forming device 102 may be capable of functioning without computer 104. Accordingly, all or a portion of imaging driver 142, or a similar driver, may be located in controller 108 of imaging image forming device 102 so as to accommodate printing and scanning functionality when operating in the standalone mode.

As will be appreciated in light of this disclosure, image forming device 102 may be configured to program Radio Frequency Identification (RFID) tags in accordance with a number of different frequencies. For example, image forming device 102 may be configured to program RFID tags at both 13.56 MHz and at 915 MHz. Other frequencies are also within the scope of the present disclosure (e.g., 2.45 GHz, 5 GHz, or any other such suitable or otherwise allocated frequency ranges). In one such embodiment, this additional functionality is programmed or otherwise integrated into controller 108. In one such case, imaging driver 142 is further programmed or otherwise configured to exploit this functionality of controller 108. Specific example architectures capable of programming RFID tags in accordance with a number of different frequencies will now be discussed in turn.

Figure 2:
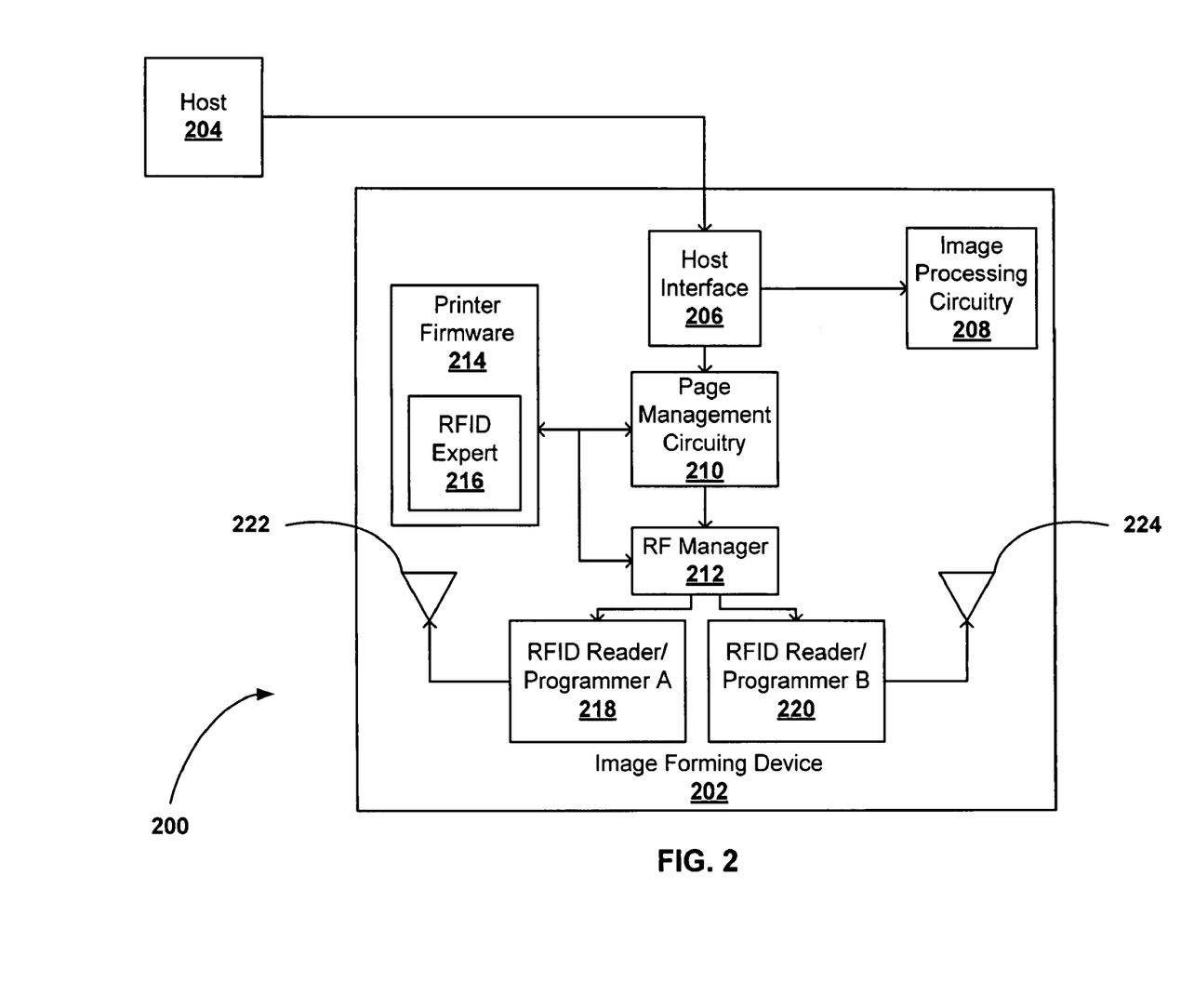
FIG. 2 is a block diagram of a system in accordance with another embodiment of the present invention.

Referring now to FIG. 2 a system 200 having an image forming device 202 and a host 204 is shown. Image forming device 202 is configured to program RFID tags in accordance with a number of different frequencies. For example, image forming device 202 may be configured to program RFID tags at both 13.56 MHz and at 915 MHz. Other frequencies are also within the scope of the present disclosure.

Image forming device 202 may transmit and receive radio frequency information to at least one RFID tag. Image forming device 202 may be further configured to manage a print job having RFID tag elements attached to individual pages and to monitor these pages and tags. The image forming device 202 may also be configured to issue timed commands to RFID reader components in order to program these tags. The image forming device 202 may further include RF transceiver circuitry that may be configured to communicate with individual tags on the media at selected operating frequencies.

Image forming device 202 may include a host interface 206 configured to communicate with host computer 204. Host interface 206 may also be in communication with image processing circuitry 208, which may include a raster image processor or similar device configured to receive and generate various forms of data. For example, image processing circuitry 208 may be configured to receive vector digital information, such as a PostScript file, and to convert that information into a high-resolution raster image. Other typical printer functions may also be implemented with image processing circuitry 208, as will be appreciated.

Host interface 206 may also be in communication with page management circuitry 210. Page management circuitry 210 may be configured to manage a print job having RFID tag elements attached to individual pages. Page management circuitry 210 may be further configured to monitor these pages and tags as they pass through various stages of system 200. For example, page management circuitry 210 may be configured to determine the precise location of a particular page and/or the location of an RFID tag on a page as the page travels through image forming device 202. In some embodiments, page management circuitry 210 may provide coordinates for a given tag on a page and may identify a zone of the image forming device 202 where the page is located. Page management circuitry 210 may also be configured to issue timed commands to RF manager 212 in order to program RFID tags.

Page management circuitry 210 may also be in communication with firmware 214. Firmware 214 may include instructions that when executed by page management circuitry 210 result in image forming device 202 performing various operations. In the example embodiment shown, firmware 214 includes an RFID expert module 216 located therein configured to store RFID information such as the communication frequency used for a particular tag or the typical required programming time.

For instance, in one such embodiment, RFID expert module 216 includes a software data structure or "a tag object", which may include information pertaining to a single RFID tag. The pseudocode for an example tag object based on the C programming language is provided below.

```
struct {
    tag_id;         // a unique identifier for this tag
    tag_frequency;  // e.g., 13.56 or 915 MHz
    tag_protocol;   // EPC2, TI Tag-IT, ISO 14443, ISO 18000-x, Etc.
    operation;      // operation to be performed (read/write/verify/etc.)
    location;       // data indicating tag's X/Y position on the page
    tag_data[N];    // data to be programmed into the tag
} tag_object;
```

As can be seen, a tag object may include a unique tag identifier (e.g., tag_id) as well as the operating frequency of the tag (e.g., tag_frequency). The tag object may further include information regarding the particular RFID transmission protocol being used (e.g., tag_protocol) and the operation being performed (e.g., read, write, verify, etc.). The tag object may also include information setting forth the coordinates indicating the position of the tag on a particular page (e.g., location) as well as the payload information programmed into the tag (e.g., tag_data[N]). Other types of information may also be incorporated into the tag object.

The incorporation of the RFID frequency and protocol information into the tag object structure may reduce the workload of the printer firmware responsible for tracking pages and tags. A tag object may be created to describe each tag on each page of a particular print job, and may be associated with the page on which the tag is to be placed. Page management circuitry 210 may then carry the tag objects along with the rest of the page information (e.g., image, margins, media type, source tray, etc.). Attaching the tag object to the page may allow certain printing tasks (e.g., page scheduling, error handling, etc.) to be done without regard for the tags themselves, and inserting the frequency and/or protocol information in the tag object may further isolate the printer firmware from the tag's characteristics.

Thus, as discussed above, in some embodiments, an RFID expert module 216 may be included within printer firmware 214 that may include RFID specific information. This information may include, but is not limited to, the RFID frequency or protocol being used for a particular tag, the typical programming time, the location of the RFID tag on a page, operation to be performed and/or the data to be programmed into the RFID tag. RFID expert module 216 may be configured to provide this information to other components of image forming device 202 upon request, in carrying out a print job involving a multi-frequency RFID tag. For example, firmware 214 may be responsible for timing page picks from input sources and may need to know the required programming time for an RFID tag on a page in order to calculate the proper pick timing for that page. In this case, the pick timing code may query RFID expert module 216 with the frequency and protocol of the relevant tag or tags and RFID expert module 216 may respond with the desired timing information. RFID expert module 216 may also be configured to obtain information from a memory unit stored, for example, within an area of the printer's non-volatile memory or other accessible memory. This memory may be updated allowing the image forming device 202 to adapt to various changes to the system (e.g., a change in RFID protocol or frequency requirements).

Page management circuitry 210 and RFID expert 216 may be in communication with RF manager 212. In some embodiments, page management circuitry 210 may be configured to send commands to RFID manager 212, which itself may be configured to communicate with at least one RFID reader/programmer, for example, RFID Reader/Programmer A 218 and RFID Reader/Programmer B 220. RFID manager 212 may be configured to determine the frequency and protocol information encoded into a given tag object received from firmware 214 and to send a tag operation command to the appropriate reader for the given frequency. Responses from RFID Reader/Programmer A 218 and RFID Reader/Programmer B 220 may be processed by RFID manager 212 and returned to printer firmware 214 as required for further processing (e.g., redirection or marking of pages, or error handling). While discussion contained herein describes the use of two reader/programmers and two antennas, this disclosure is not intended to be limited to these embodiments, as additional RFID reader/programmers and antennas configured to operate at other frequencies may be included as well. Moreover, note that variations in architecture are possible. For instance, functionality associated with page management circuitry 210, RFID expert 216, and RF manager 212 may be integrated into a single module, or even into page management circuitry 210. Likewise, RFID expert 216 and RF manager 212 can be combined into a single logical unit. Numerous such variations will be apparent.

In some embodiments, RFID Reader/Programmer A 218 and RFID Reader/Programmer B 220 may each operate in a distinct frequency band. For example, RFID Reader Programmer A 218 may be configured to operate at approximately a 13.56 MHz frequency band (e.g., 13.56 MHz±0.5 MHz) while RFID Reader Programmer B 220 may be configured to operate at approximately a 900 MHz frequency band (e.g., 902 MHz to 928 MHz for U.S. band, and/or 865 MHz to 868 MHz for European band). Examples of RFID Reader/Programmers that can be incorporated into image forming device 202 include, but are not limited to, a THINGMAGIC Mercury 4E embedded reader module configured to drive a 915 MHz antenna and read Electronic Product Code Generation 2 tags, available from ThingMagic of Cambridge, Mass., or a SIRIT INFINITY 9311, available from Sirit, Inc. of Carrollton, Tex. Other modules may include a Texas Instruments TRF7960 reader module ASIC configured to drive a 13.56 MHz antenna. Both RFID Reader/Programmer 218 and 220 may utilize common standards-based serial interfaces (e.g., RS232, SPI bus, etc) for host communications with various data protocols. Likewise, both 218 and 220 can be addressed by a layer of control logic (e.g., encoded in the printer firmware 214, or directly in RF Manager module 212).

RFID Reader/Programmer A 218 and RFID Reader/Programmer B 220 may each be in communication with its own an RFID antenna. For example, RFID Reader/Programmer A 218 may be connected to RFID antenna 222 and RFID Reader/Programmer B 220 may be connected to RFID antenna 224. Each RF antenna 222 and 224 may be configured to emit and/or receive radio waves of various frequencies. For example, in some embodiments RF antenna 222 may be configured to operate at the 13.56 MHz band while RF antenna 224 may be configured to operate at the 915 MHz band. Other frequencies may also be utilized in accordance with the present disclosure.

Figure 3:
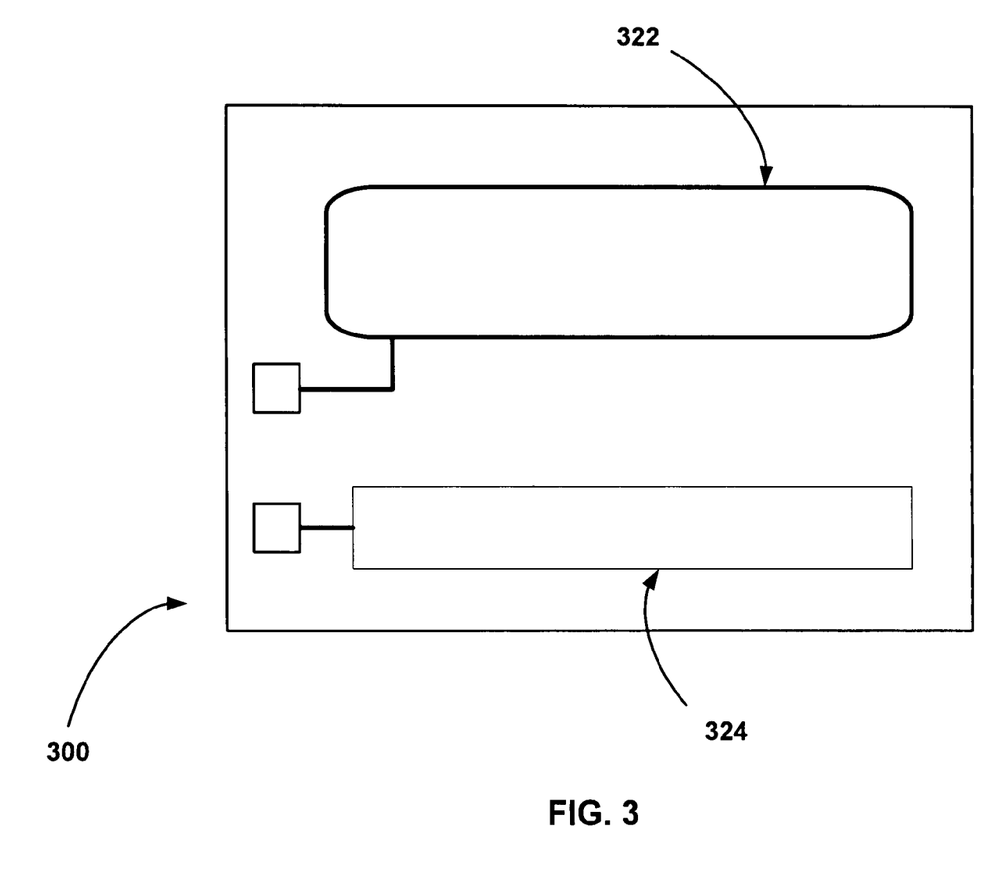
FIG. 3 is an illustration of a dual RFID antenna in accordance with an embodiment of the present invention.

Each of RF antennas 222 and 224, which can be implemented separately from one another or together in a single assembly (e.g., as shown in FIG. 3), may include a conductive element that may be used by image forming device 202 to read and/or program an RFID tag, as well as to confirm whether or not the RFID tag is operating properly. As such, each of RF antennas 222 and 224 may be in communication with at least one RFID tag, which may respond by transmitting data back to the antenna. This data may be transmitted in accordance with a variety of different communication protocols of different frequency ranges. A number of factors may affect the distance at which a tag may be read (i.e., the read range). The frequency used for identification, the antenna gain, the orientation and polarization of the reader antenna and the transponder antenna, as well as the placement of the RFID tag on a sheet of media may all have an impact on the read range of system 200.

Note that the architecture shown in FIG. 2 is provided to facilitate explanation of an example embodiment of the present invention. However, and as will be appreciated, some components and functions of a typical printing system have been omitted, so as to provide focus relevant to this disclosure. Various embodiments will include this additional architecture and functionality, or portions or combinations thereof.

Referring now to FIG. 3, an embodiment showing an antenna assembly 300 for use with any of the embodiments described herein (e.g., system 200) is provided. Antenna assembly 300 may include RF antennas 322 and 324, which may be combined into a single substrate, resulting in a single antenna subassembly. This subassembly may be included within image forming device 202 during manufacturing or alternatively, as an after-market option. Antenna assembly 300 may be located into or adjacent to the image forming device's media path in such a way that as media is fed through the image forming device it passes in close proximity to antenna assembly 300.

In some embodiments, RF antenna 322 may be a loop antenna configured to operate at approximately a 13.56 MHz operating frequency while RF antenna 324 may be a patch antenna configured to operate at approximately a 915 MHz frequency. Numerous types of antennas may be selected, including, but not limited to, patch antennas, antenna coils, loop antennas, stick antennas, antenna arrays, etc.

Antenna assembly 300 may provide for a straightforward installation approach and may simplify the coordination of timing between various tag types. For example, if RF antennas 322 and 324 are each present in a single assembly 300 in image forming device 202, the timing calculations required to program the RFID tags may be based on the assumption that the events occur at or near the same point in the paper path. This may reduce the number and/or complexity of operations required and may help increase system performance.

Figure 4:
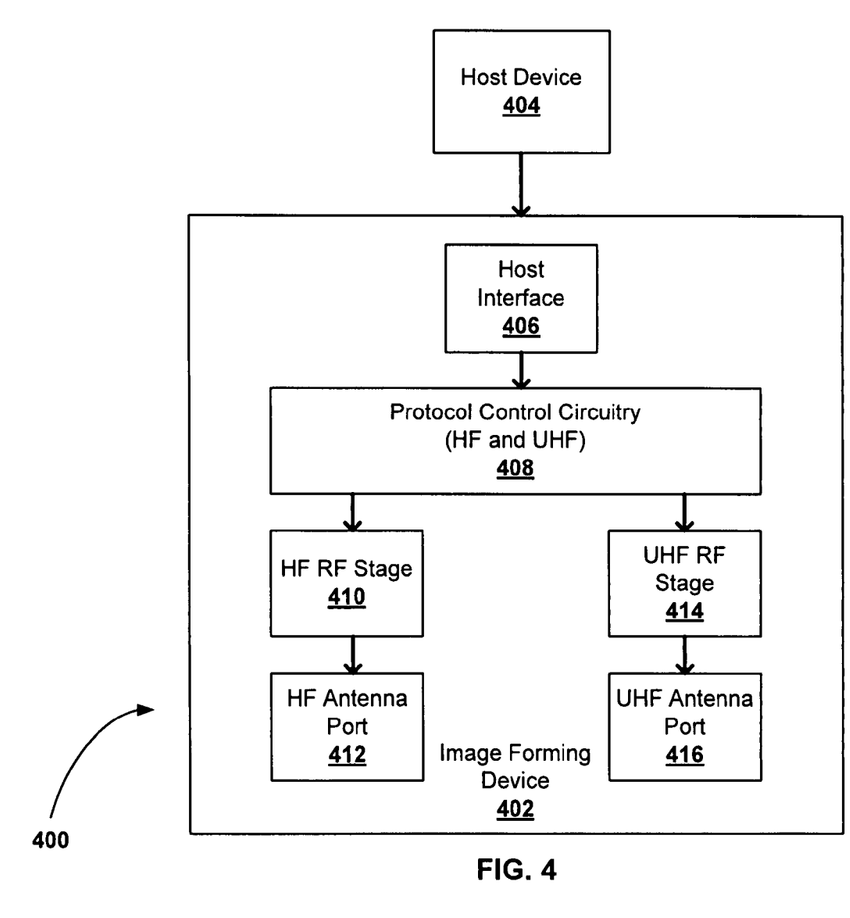
FIG. 4 is a block diagram of a system in accordance with another embodiment of the present invention.

Referring now to FIG. 4 another embodiment of a system 400 in accordance with the present disclosure is shown. System 400 may include image forming device 402 and host device 404. Image forming device 402 may include a host interface 406 configured to communicate with host device 404 and protocol control circuitry 408. Protocol control circuitry 408 may incorporate a number of the components shown in FIG. 2 into one single unit, thus reducing the number of subsystems required. For example, the RF Manager module 212 and RFID Reader/Programmers 218 and 220 shown in FIG. 2 may be incorporated into protocol control circuitry 408 creating a multiple frequency RFID Reader/Programmer module. In one such embodiment, protocol control circuitry 408 is implemented as a software defined radio that combines the digital processing portions of the two reader modules 218 and 220 and the RF Manager module 212 logic, such that the software defined radio is capable of carrying out the multi-frequency RFID functionality described herein.

Protocol control circuitry 408 may be configured to communicate at a variety of different frequencies, including, but not limited to, HF, UHF, microwave, etc. As an example, the embodiment of FIG. 4 depicts protocol control circuitry 408 including both high frequency (HF) and ultra-high frequency (UHF) capabilities. As such, protocol control circuitry 408 may be in communication with a high frequency RF stage 410 coupled to a high frequency antenna port 412 as well as an ultra-high frequency RF stage 414 coupled to an ultra-high frequency antenna port 416. These RF stages 410 and 414 can be implemented, for example, using conventional RF transceiver technology to operatively couple the circuitry 408 to ports 412 and 416. HF antenna port 412 may be configured to communicate with a high frequency RFID tag while UHF antenna port 416 may be configured to communicate with an ultra-high frequency RFID tag.

Figure 5:
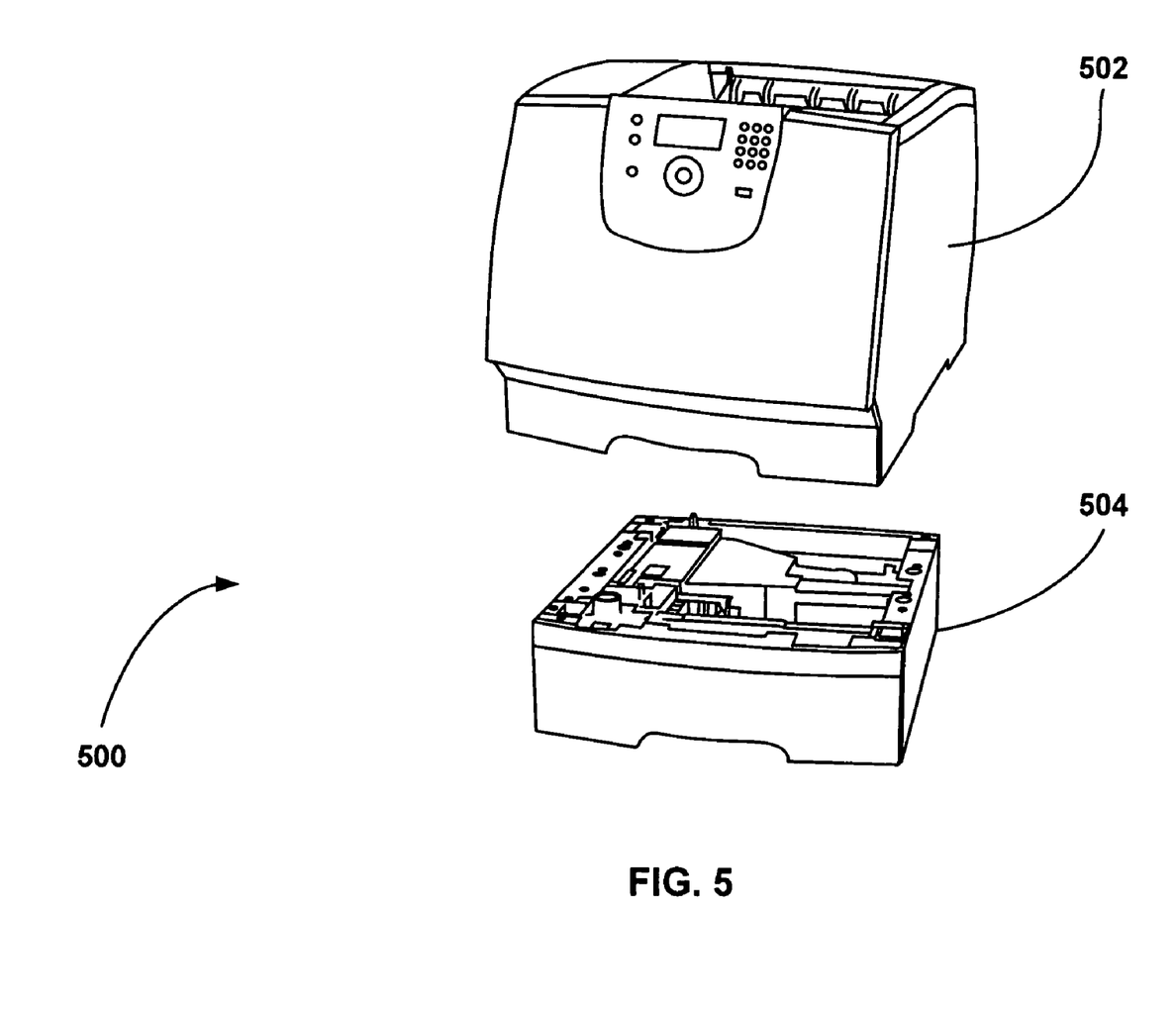
FIG. 5 is an illustration of an option device having dual RFID frequency capability in accordance with yet another embodiment of the present invention.

Referring now to FIG. 5, another embodiment of a system 500 in accordance with the present disclosure is shown. FIG.

5 depicts an image forming device 502 configured to receive a removable module 504, which may be attached or removed from image forming device 502. Removable module 504 may include the RFID functionality described in any of the embodiments of the present disclosure. For example, removable module 504 may include multiple RFID antennas and/or RFID reader/programmers configured to communicate with RFID tags at various frequencies. Removable module 504 may be encased in a housing for ease of connectivity with image forming device 502, and it may include alignment features to engage with the printer and or electrical connections that may be keyed to engage and communicate with the image forming device controller. Removable module 504 may be configured to include any of the aspects of some or all of the embodiments discussed in FIGS. 1-4.

Figure 6:
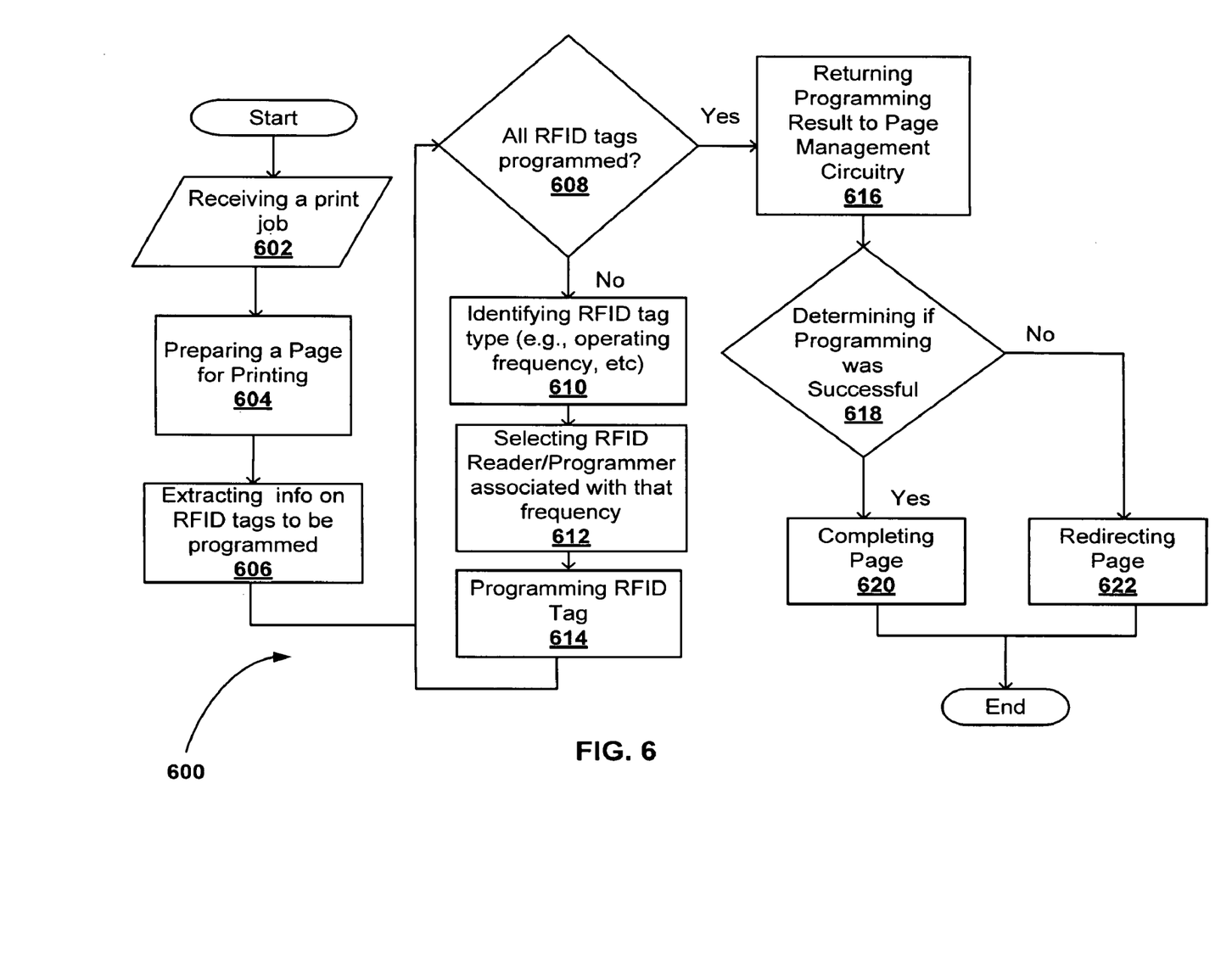
FIG. 6 is a flowchart depicting example operations in accordance with an embodiment of the present invention.

Referring now to FIG. 6, a flowchart 600 depicting exemplary operations in accordance with the present disclosure is provided. The functionality demonstrated (or portions thereof) may be carried out, for example, by the controller 108 (FIG. 1), the RF Manager module 212 (FIG. 2), the protocol control circuitry 408 (FIG. 4), or any multi-frequency RFID label printer. Operations may include receiving a print job at an image forming device (602) and preparing a page for printing (604). The print job may include, for example, one RFID label associated with two or more frequencies, or two RFID labels each associated with a different frequency. Numerous such multi-frequency RFID label schemes will be apparent in light of this disclosure. Operations may further include extracting (606) or otherwise accessing information on RFID tags to be programmed, which may involve, for example, reading tag objects stored in RFID expert module 216. As can be seen, a determination is made to check if all selected or otherwise target RFID tags have been programmed (608). If a tag has not been programmed, operations include identifying an RFID tag type (610) associated with the multi-frequency RFID label scheme, which in one particular embodiment includes identifying the RFID operating frequency. Other information associated with a particular tag type may also be identified (e.g., RFID tag protocol, typical programming time, location of RFID tag on a page, operation to be performed and/or the data to be programmed into the RFID tag). The method continues with selecting an appropriate RFID reader/programmer associated with the tag frequency (612), and programming the RFID tag (614). This process can be repeated for each tag to be programmed, until all selected tags are programmed. If it is determined that all the RFID tags have been programmed, operations may further include returning the programming result to page management circuitry (616) and determining if the programming was successful (618). If the programming was successful, the page may be completed (620). If not, the page may be redirected for reprogramming or disposal (622). Other operations are also within the scope of the present disclosure.

Figure 7:
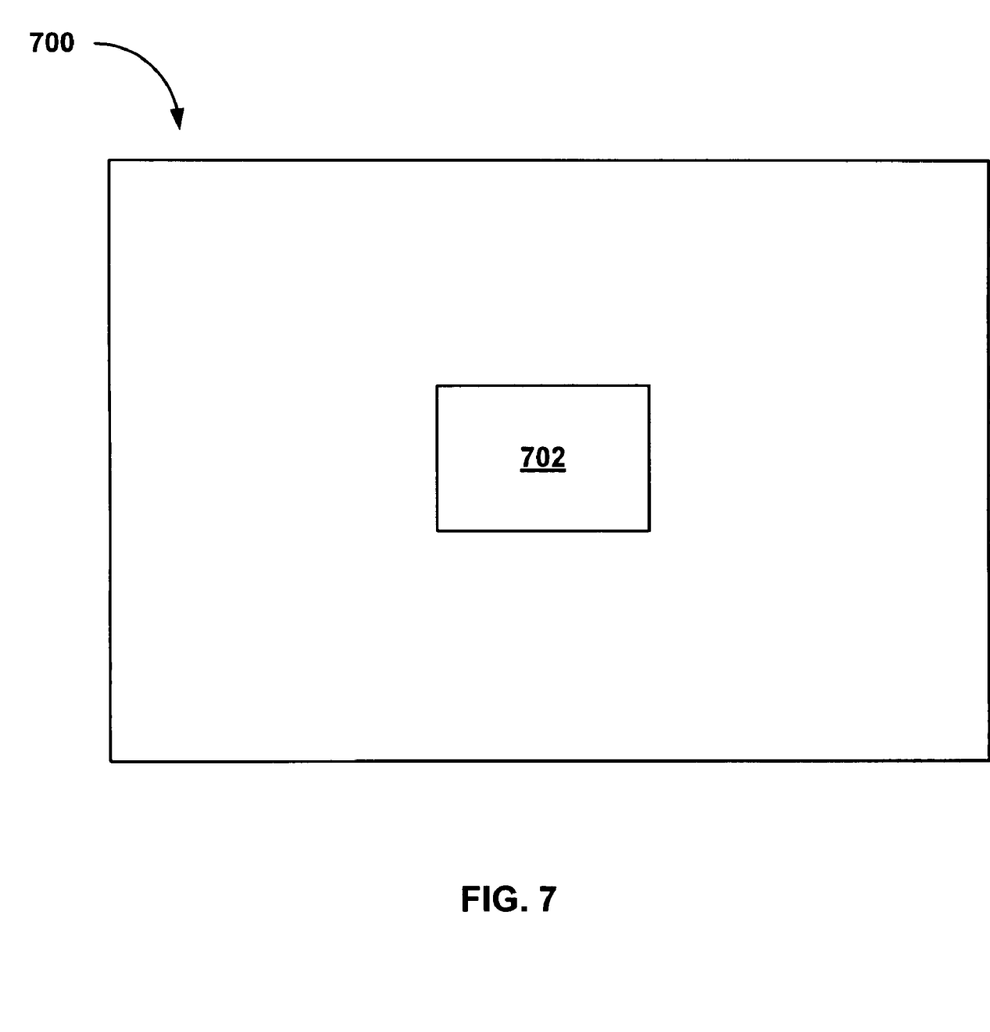
FIG. 7 is an illustration of an article of machine readable media in accordance with yet another embodiment of the present invention.

Referring now to FIG. 7, an article 700 including a computer readable storage medium having stored thereon instructions 702 that when executed by a machine (e.g., central processing unit or microcontroller) result in any of the operations described in FIGS. 1-6. Article 700 may include, but is not limited to, any type of machine readable disk or storage device including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EE-PROMs), flash memories, magnetic or optical cards, or any type of media suitable for storing electronic instructions. Other embodiments may be implemented as software modules executed by a programmable control device.

As such, it should also be appreciated that the functionality described herein for the embodiments of the present disclosure may be implemented in hardware, software, or a combination of hardware and software, either within the image forming device or in the removable RFID module, as desired.

The term "memory" as described herein may include any media capable of storing instructions adapted to be executed by a processor. Some examples of such memory may include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on medium in a variety of different formats, including, but not limited to, a compressed and/or encrypted format.

As used in any embodiment described herein, "circuitry" may comprise, for example, singularly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. For instance, any modules or circuitry may be implemented as one or more ASICs or FPGAs or a microcontroller unit with I/O capability and one or more embedded routines for carrying out RFID functionality as described herein.

Thus, architectures and methodologies are disclosed that effectively combine the ability to program multiple frequency (e.g., HF and UHF) RFID tags into a single printer or other suitable image forming device. Such an arrangement allows a user flexibility to choose the tag type best suited to each specific application, and to mix or combine multiple tag types in a single media, if so desired.

The foregoing description of several embodiments of the present disclosure has been presented for purposes of illustration. These embodiments are not intended to be exhaustive or to limit the invention to the precise steps and/or forms disclosed, and many modifications and variations are possible in light of the above teaching. It is intended that the scope of the invention be defined by the claims appended hereto. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

What is claimed is:

1. A device for enabling printing of a multi-frequency RFID label scheme, comprising:
   a first circuit configured to program a first RFID tag having a first frequency;

a second circuit configured to program a second RFID tag having a second frequency, the first and second RFID tags being associated with the multi-frequency RFID label scheme;

a third circuit for receiving a request having the multi-frequency RFID label scheme; and a fourth circuit for communicating with and controlling each of the first and second circuits, and selecting at least one thereof based upon one or more RFID tag types or frequencies identified in the request having the multi-frequency RFID label scheme.

2. The device of claim 1, further comprising:

a first antenna operatively coupled to the first circuit, said first antenna configured to permit communication between said first circuit and said first RFID tag over said first frequency; and a second antenna operatively coupled to said second circuit, said second antenna configured to permit communication between said second circuit and said second RFID tag over said second frequency.

3. The device of claim 2, wherein said first and second antennas are combined into a single substrate to form a single antenna assembly.

4. The device of claim 2, wherein said first antenna is configured to operate at approximately 13 to 14 MHz and said second antenna is configured to operate at approximately 865 to 928 MHz.

5. The device of claim 1, further comprising a storage module configured to store a first tag object encoded with RFID tag information corresponding to said first RFID tag and a second tag object encoded with RFID tag information corresponding to said second RFID tag, wherein the fourth circuit has access to the first and second tag objects.

6. The device of claim 5, wherein said RFID information includes one or more of a tag identifier, a tag operating frequency, a tag protocol, an operation to be performed, a tag position and data to be programmed.

7. The device of claim 1, wherein the device is a physically removable module configured to be operatively coupled with a printing device.

8. The device of claim 1, wherein the device is a printing device.

9. The device of claim 1, wherein the first RFID tag is an HF RFID tag and the second RFID tag is a UHF RFID tag.

10. The device of claim 1, wherein the first circuit, second circuit, third circuit, and fourth circuit are integrated into a single module.

11. The device of claim 10, further comprising:

a first RF stage for operatively coupling the single module to a first antenna; and a second RF stage for operatively coupling the single module to a second antenna.

12. The device of claim 1, wherein the fourth circuit selects both the first and second circuits for programming the first and second tags, respectively, based upon the request.

13. A method for printing a multi-frequency RFID label scheme, comprising:

receiving a print job that includes a multi-frequency RFID label scheme;

accessing RFID tag information associated with the multi-frequency RFID label scheme;

identifying a first RFID tag type associated with the multi-frequency RFID label scheme, including a first RFID operating frequency;

selecting a first RFID programmer associated with the first RFID operating frequency, the selecting of the first RFID programmer being based upon the multi-frequency RFID label scheme in the print job;

programming a first RFID tag associated with the first RFID operating frequency by the first RFID programmer;

identifying a second RFID tag type associated with the multi-frequency RFID label scheme, including a second RFID operating frequency;

selecting a second RFID programmer associated with the second RFID operating frequency, the selecting of the second RFID programmer being based upon the multi-frequency RFID label scheme in the print job; and programming a second RFID tag associated with the second RFID operating frequency by the second RFID programmer.

14. The method of claim 13, further comprising determining if said programming the first and second RFID tags was successful.

15. The method of claim 13, further comprising returning a programming result to page management circuitry.

16. The method of claim 13, wherein said identifying the first and second RFID tag types includes accessing at least one tag object data structure, the at least one tag object data structure encoded with RFID information of the first and second RFID tags associated with the multi-frequency RFID label scheme.

17. The method of claim 13, further comprising:

identifying a third RFID tag type associated with the multi-frequency RFID label scheme, including a third RFID operating frequency;

selecting an RFID programmer associated with the third RFID operating frequency; and programming a third RFID tag associated with the third RPID operating frequency.

18. The method of claim 13, further comprising printing the multi-frequency RFID label scheme using a single printing device.

19. The method of claim 13, further comprising printing the multi-frequency RFID label scheme on a single media using a single printing device.

20. A non-transitory article, comprising one or more storage mediums having stored thereon instructions that when executed by one or more processors result in execution of a process for printing a multi-frequency RFID label scheme, the process comprising:

receiving a print job that includes a multi-frequency RFID label scheme;

accessing RFID tag information associated with the multi-frequency RFID label scheme;

identifying a first RFID tag type associated with the multi-frequency RFID label scheme, including a first RFID operating frequency;

selecting a first RFID programmer associated with the first RFID operating frequency, the selecting of the first RFID programmer being based upon the multi-frequency RFID label scheme in the print job;

programming a first RFID tag associated with the first RFID operating frequency by the first RFID programmer;

identifying a second RFID tag type associated with the multi-frequency RPID label scheme, including a second RFID operating frequency;

selecting a second RFID programmer associated with the second RFID operating frequency, the selecting of the second RFID programmer being based upon the multi-frequency RFID label scheme in the print job; and programming a second RFID tag associated with the second RFID operating frequency by the second RFID programmer.

21. The article of claim 20, further comprising:
returning a programming result to page management circuitry;
printing the multi-frequency RFID label scheme using a single printing device.

22. The article of claim 20, wherein said identifying first and second RFID tag types includes accessing at least one tag object data structure, the at least one tag object data structure encoded with RFID information of the first and second RFID tag types associated with the multi-frequency RFID label scheme.

* * * * *